(12) United States Patent
Gupta

(10) Patent No.: US 9,017,627 B2
(45) Date of Patent: Apr. 28, 2015

(54) PROCESS FOR REMOVING HYDROGEN SULFIDE FROM VERY SOUR HYDROCARBON GAS STREAMS USING METAL SULFIDE

(75) Inventor: Puneet Gupta, Houston, TX (US)

(73) Assignee: Shell Oil Company, Houston, TX (US)

( * ) Notice: Subject to any disclaimer, the term of this patent is extended or adjusted under 35 U.S.C. 154(b) by 889 days.

(21) Appl. No.: 13/238,908

(22) Filed: Sep. 21, 2011

(65) Prior Publication Data

US 2013/0071310 A1  Mar. 21, 2013

(51) Int. Cl.
*B01D 53/52* (2006.01)
*B01D 53/96* (2006.01)
*C01B 17/52* (2006.01)
*C10L 3/10* (2006.01)
*B01D 53/14* (2006.01)

(52) U.S. Cl.
CPC ............ *B01D 53/52* (2013.01); *B01D 53/1468* (2013.01); *B01D 53/96* (2013.01); *B01D 2251/304* (2013.01); *B01D 2251/60* (2013.01); *B01D 2253/1128* (2013.01); *C10L 3/103* (2013.01)

(58) Field of Classification Search
None
See application file for complete search history.

(56) References Cited

U.S. PATENT DOCUMENTS

| | | | |
|---|---|---|---|
| 2,979,384 A | 4/1961 | Weiner et al. | 23/212 |
| 4,252,778 A | 2/1981 | Yang et al. | 423/230 |
| 4,439,412 A | 3/1984 | Behie et al. | 423/573 |

*Primary Examiner* — Stanley Silverman
*Assistant Examiner* — Daniel Berns
(74) *Attorney, Agent, or Firm* — Charles W. Stewart

(57) ABSTRACT

A process for sweetening a gas stream containing hydrogen sulfide wherein said process comprises contacting said gas stream within a contacting zone a contacting composition comprising metal sulfide in a lower sulfided state and yielding from said contacting zone a product gas stream having a reduced hydrogen sulfide concentration and a recovered contacting composition comprising metal sulfide in a higher sulfided state.

16 Claims, 9 Drawing Sheets

Figure 1:
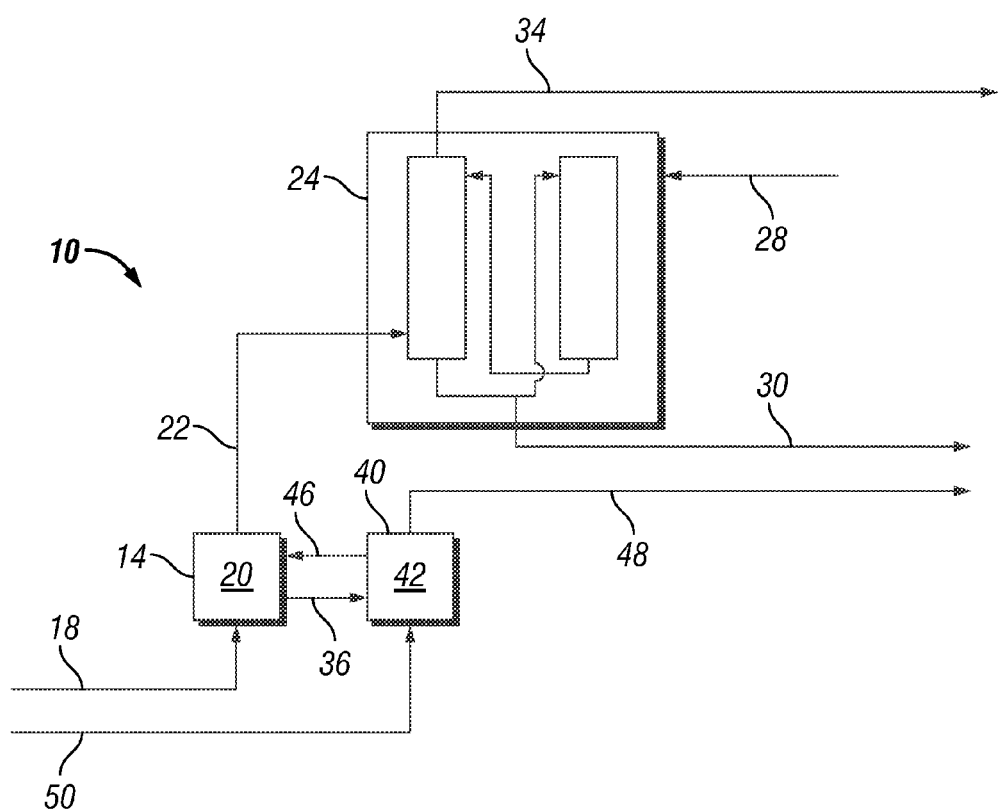

PROCESS FOR REMOVING HYDROGEN SULFIDE FROM VERY SOUR HYDROCARBON GAS STREAMS USING METAL SULFIDE

This invention relates to a process for removing hydrogen sulfide from a gas stream that contains hydrogen sulfide by converting it with the use of a metal sulfide to yield hydrogen.

There are reservoirs of natural gas in many parts of the world that are not producible because the available natural gases contain concentrations of hydrogen sulfide that are so high that the hydrogen sulfide cannot economically be removed so as to provide saleable treated natural gas product. These sources of sour natural gas, however, still can contain large amounts of valuable hydrocarbons. So, if the hydrogen sulfide could be economically removed from these extremely sour natural gases, then many previously non-producible gas reservoirs can become producible. It, thus, is desirable to have a process for sweetening sour natural gas streams having extremely high concentrations of hydrogen sulfide.

One early process for the treatment of gas streams containing hydrogen sulfide is disclosed in U.S. Pat. No. 2,979,384. This process involves passing gaseous hydrogen sulfide over and contacting it with a lower sulfide of a metal selected from iron, nickel, and cobalt to produce hydrogen and a higher sulfide of the metal as reaction products. The higher sulfide of the metal is then heated to convert the higher sulfide to a lower sulfide and to produce vaporous elemental sulfur. The resulting lower sulfide is again reacted with hydrogen sulfide to produce hydrogen and the higher sulfide thus making the process a cyclic conversion and regeneration of the lower metallic sulfide. The lower metallic sulfide is typically a monosulfide of iron, nickel or cobalt. The two reactions of this process may be represented as follows: (1) $MeS+H_2S=MeS_2+H_2$ and (2) $xMeS_2+Heat=xMeS+S_x$. The '384 patent does not recognize the use of molecular oxygen in the regeneration of the higher metal sulfide by contacting it with molecular oxygen so as to convert the higher metal sulfide to a lower metal sulfide and to release heat and yield sulfur dioxide.

U.S. Pat. No. 4,252,778 discloses a process for that uses solid particulate sorbents comprising sulfurous iron compounds to desulfurize a gas stream. This is done by contacting the gas stream at an elevated temperature with limestone particulates that comprise iron sulfide. The iron sulfide catalyzes the absorption of sulfurous gases by the limestone. The '778 patent does not disclose anything concerning the use of lower iron sulfide to react with hydrogen sulfide to yield molecular hydrogen and a higher iron sulfide nor does it disclose the regeneration of a higher iron sulfide by contacting it with oxygen to release heat and to yield a lower iron sulfide, sulfur dioxide and sulfur.

U.S. Pat. No. 4,439,412 discloses a process for the decomposition of hydrogen sulfide gas to produce hydrogen and sulfur by using a metal chemical catalyst that may include quantities of cobalt, silicate, iron, alumina, silicon, nickel, vanadium, copper, zinc and sulfur with iron being the most preferred. The metal chemical catalyst is used to convert hydrogen sulfide to yield hydrogen and to chemically bind up the sulfur with the metal chemical catalyst. The metal chemical catalyst is then regenerated by raising its temperature to release gaseous elemental sulfur. When iron is used as the chemical catalyst, the two-step process may be represented by the following reactions: (1) $FeS(s)+H_2S(g) \rightarrow FeS_2(s)+H_2(g)$ and (2) $FeS_2(s) \rightarrow FeS(s)+\frac{1}{2}S_2(g)$. The '412 patent does not disclose the regeneration of a higher metal sulfide by contacting it with molecular oxygen to convert the higher metal sulfide to a lower metal sulfide to release heat and to yield sulfur dioxide and sulfur.

The prior art indicates that there has been much interest in finding new, useful and economical ways of processing hydrogen sulfide-containing gas streams so as to remove therefrom the hydrogen sulfide. The prior art also teaches the desirability to convert hydrogen sulfide in ways so as to yield molecular hydrogen and elemental sulfur. There is an ongoing need, however, to provide processes that are capable of economically treating gaseous hydrocarbon streams that contain particularly high concentrations of hydrogen sulfide in order to provide treated or sweetened gas that may be sold in the marketplace.

Thus, it is desirable to have a process that can suitably treat a gas stream having a concentration of hydrogen sulfide, and, in particular, a significantly high concentration of hydrogen sulfide, in order to remove the hydrogen sulfide therefrom.

It also may be desirable for the process to yield molecular hydrogen, which can be used in a variety of applications.

It further may be desirable for the process to yield sulfur dioxide or elemental sulfur, or both, which have a variety of potential uses.

Accordingly, provided is a process for sweetening a sour gas having a hydrogen sulfide concentration. This process comprises introducing the sour gas stream into a sulfidation zone, operated under suitable sulfidation conditions and containing a lower metal sulfide, and contacting therein the gas stream with the lower metal sulfide to thereby yield molecular hydrogen and a higher metal sulfide; and passing from the sulfidation zone a treated gas stream containing molecular hydrogen and having a reduced hydrogen sulfide concentration.

FIG. 1 is a process flow schematic that presents one or more embodiments of the inventive process for sweetening a sour gas having a hydrogen sulfide concentration and to yield molecular hydrogen and sulfur dioxide.

Figure 2:
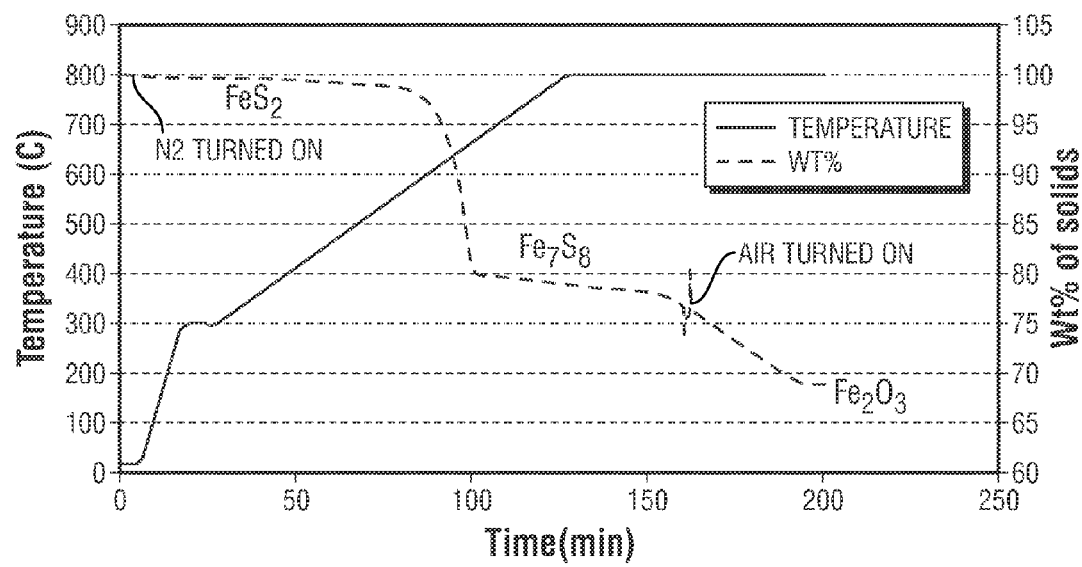
Figure 3:
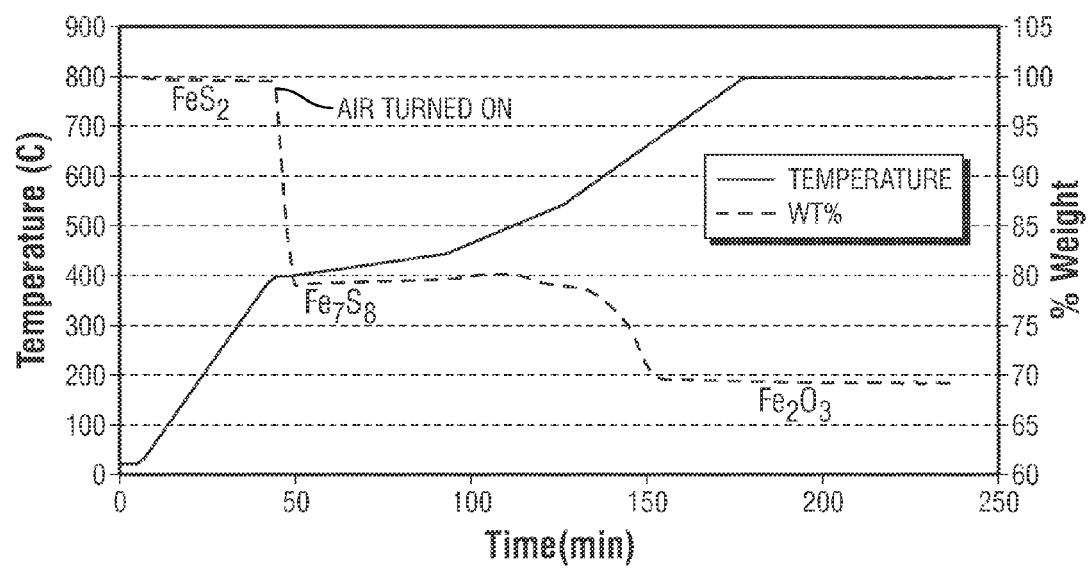
Figure 4:
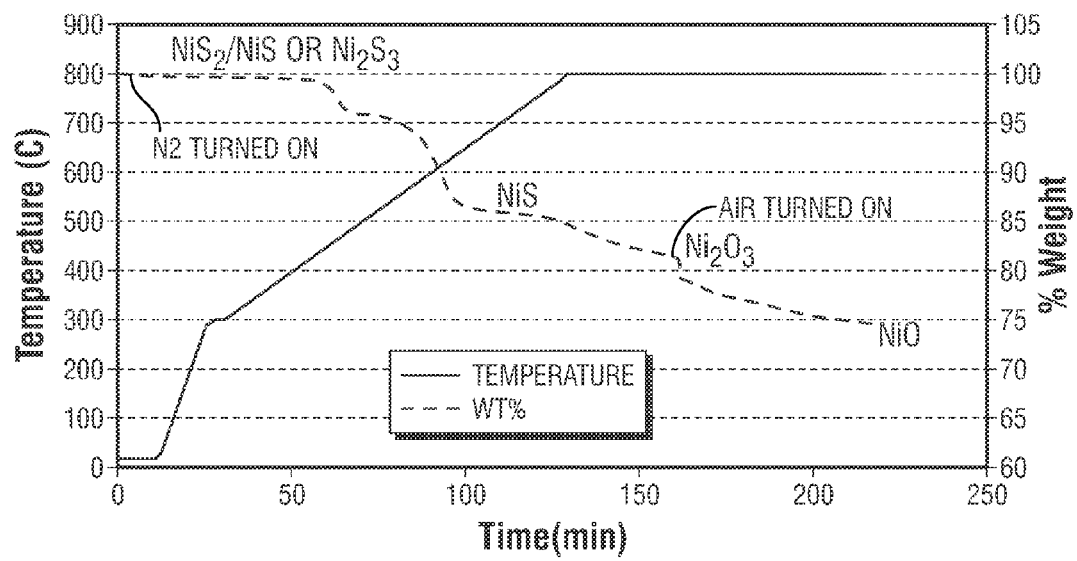
Figure 5:
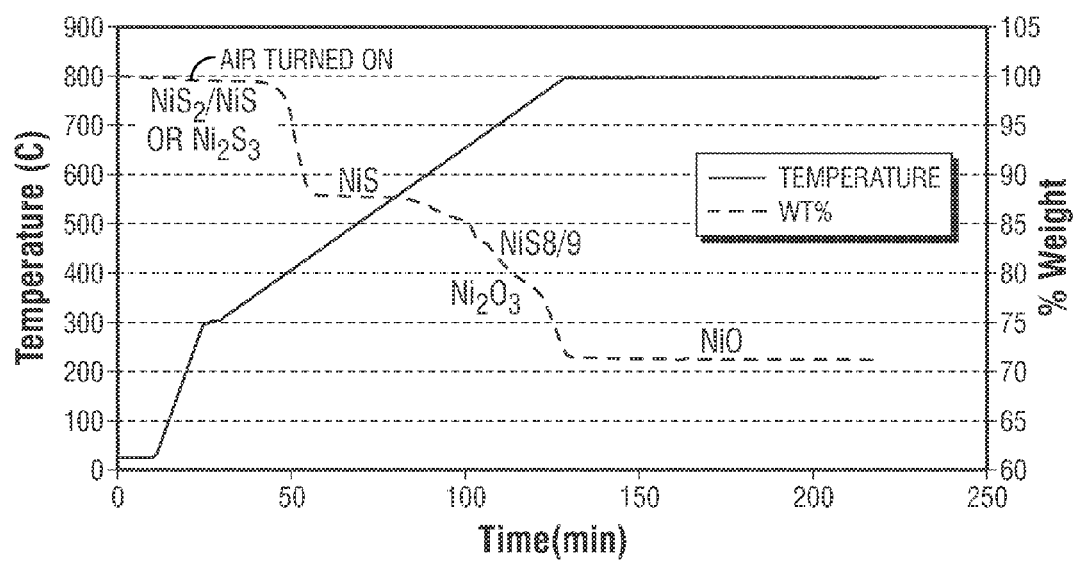
Figure 6:
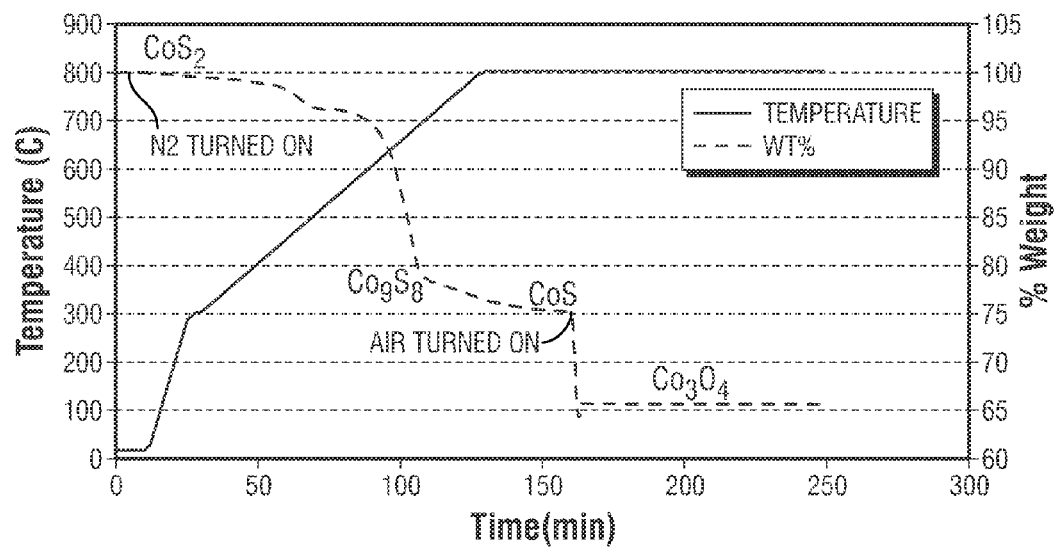
Figure 7:
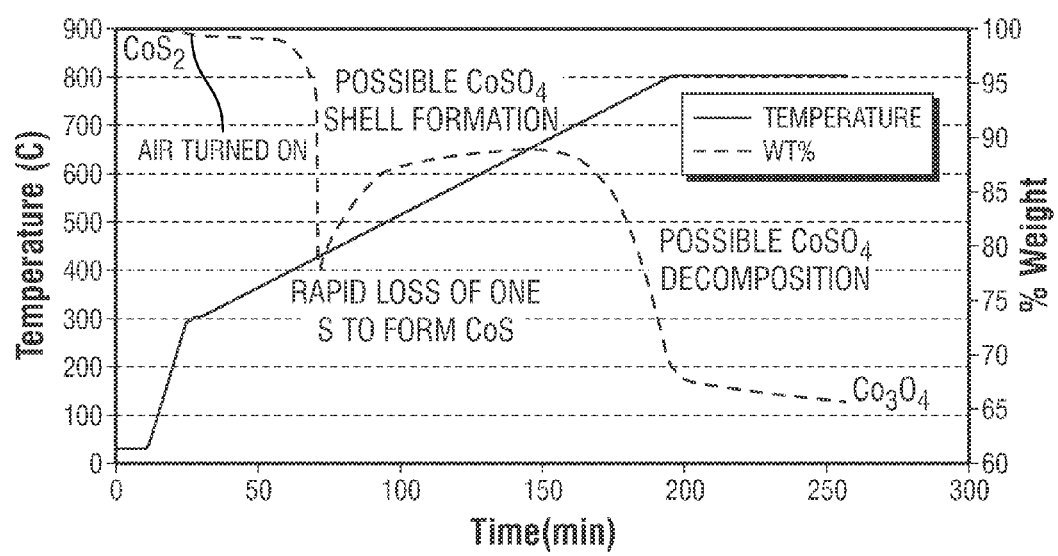
Figure 8:
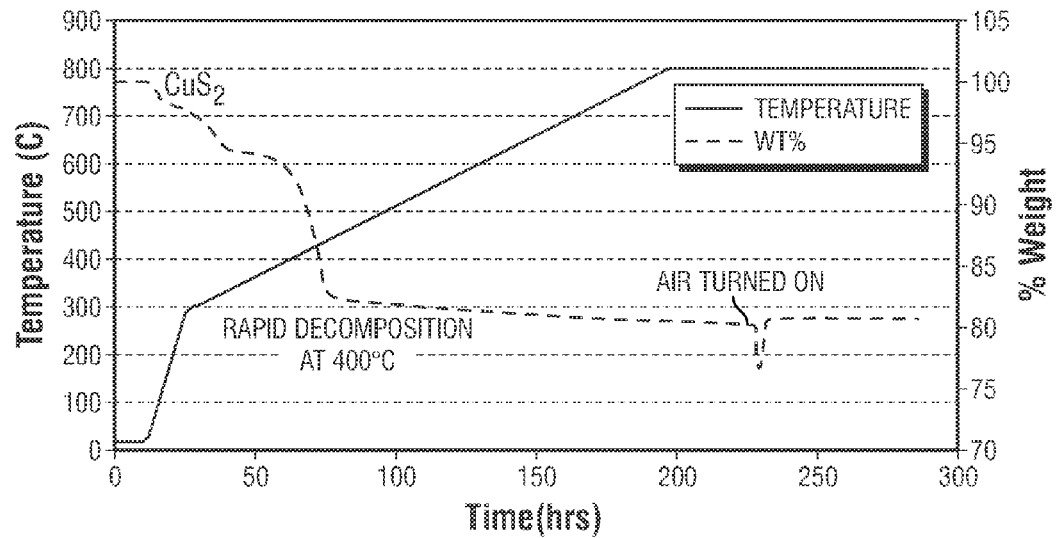
Figure 9:
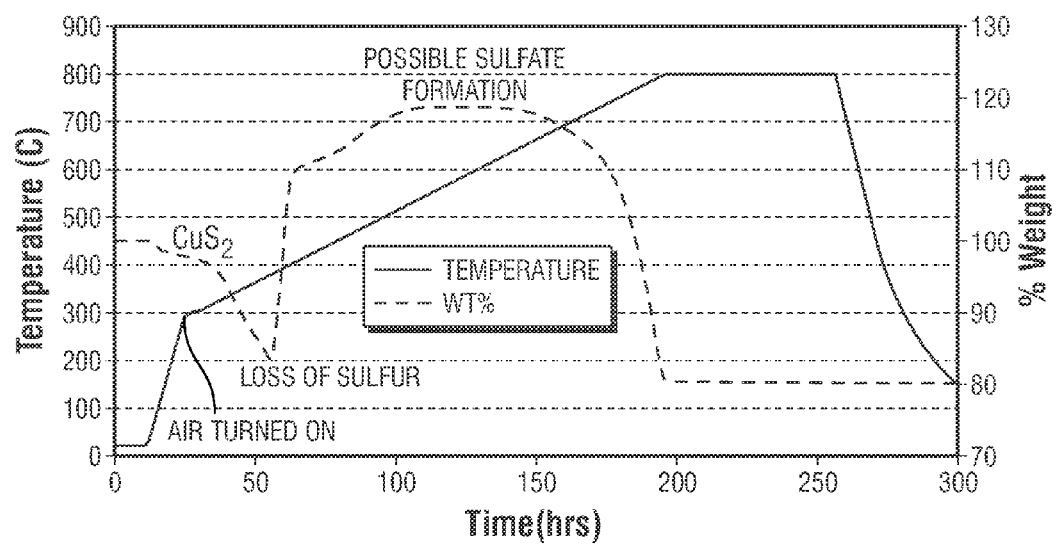
Figure 10:
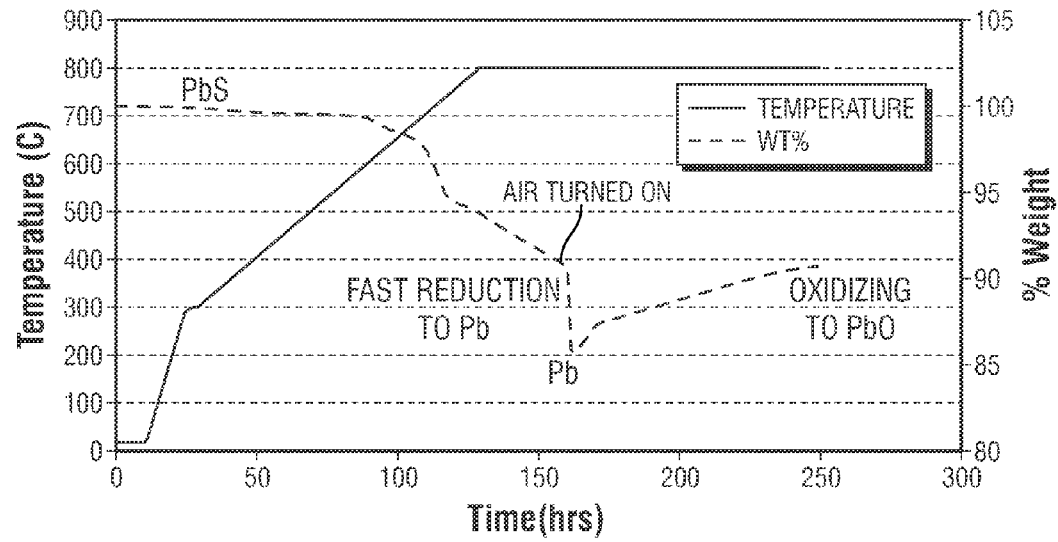
Figure 11:
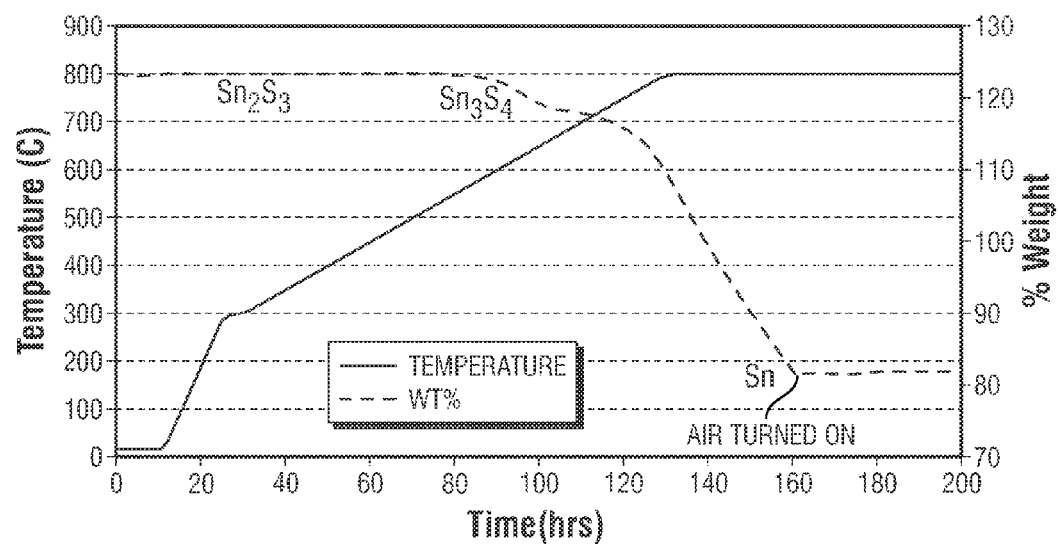
Figure 12:
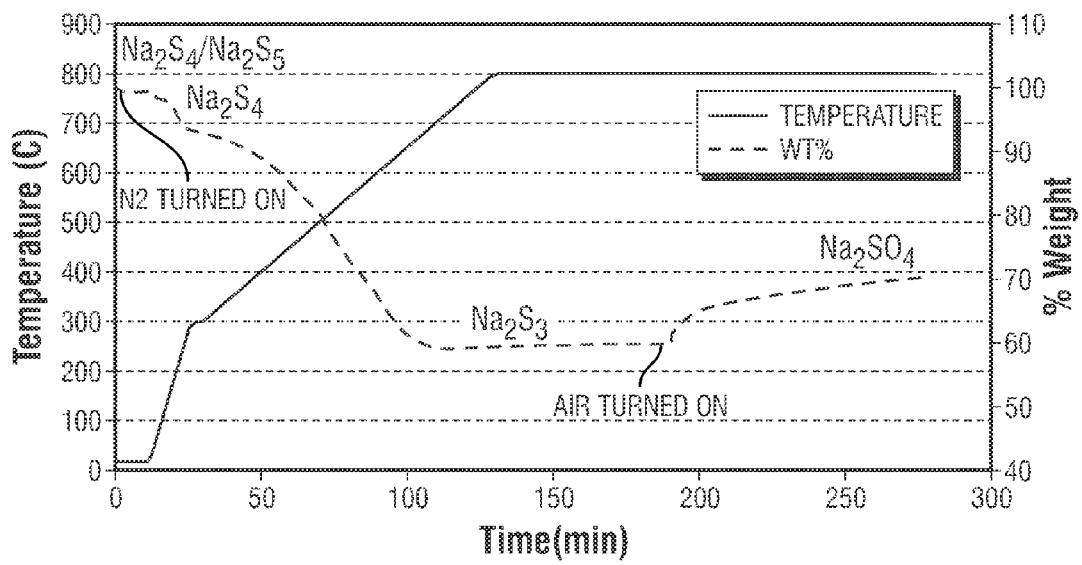
Figure 13:
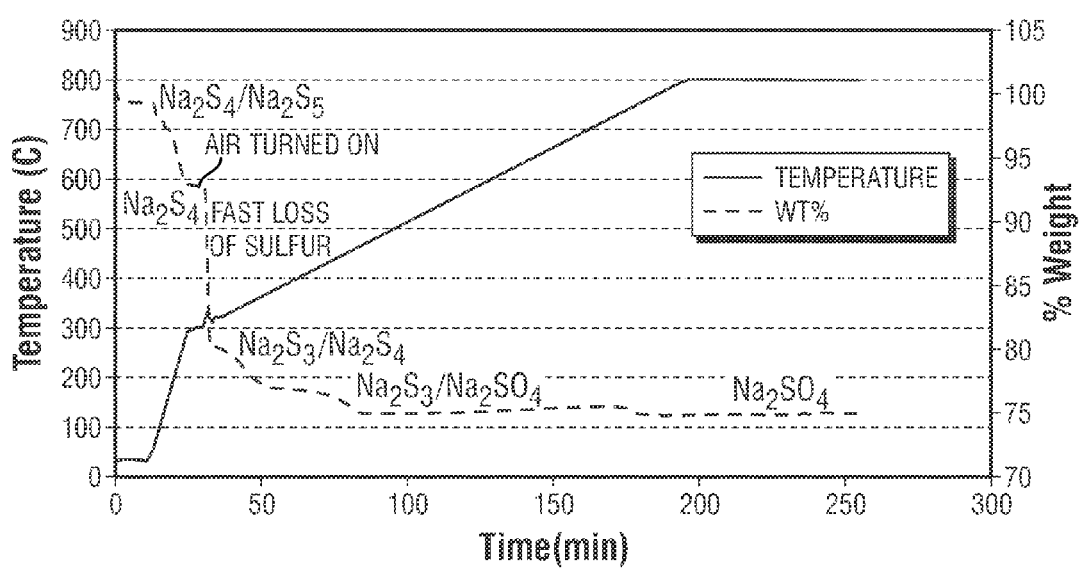
Figure 14:
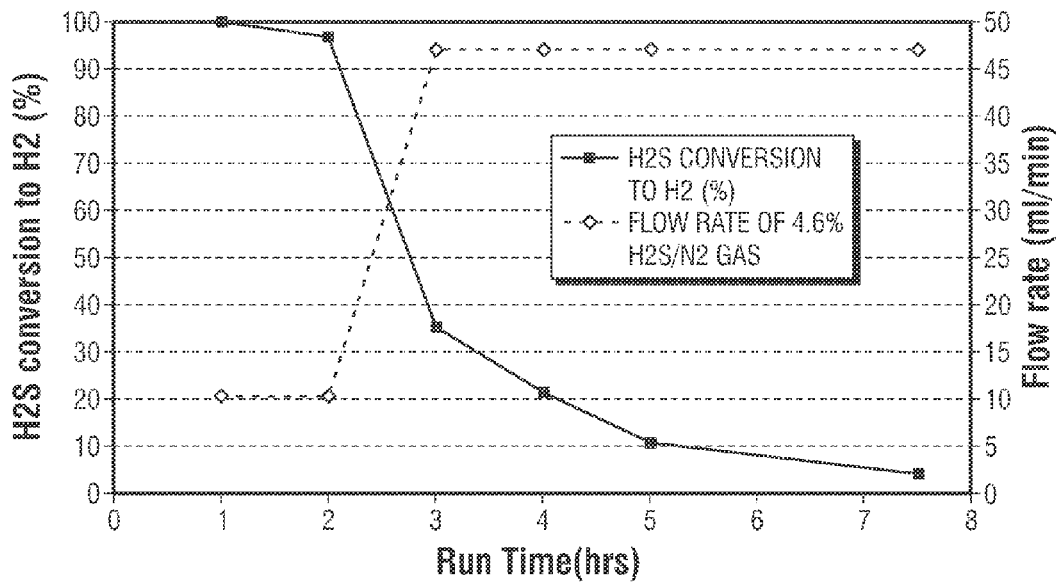
Figure 15:
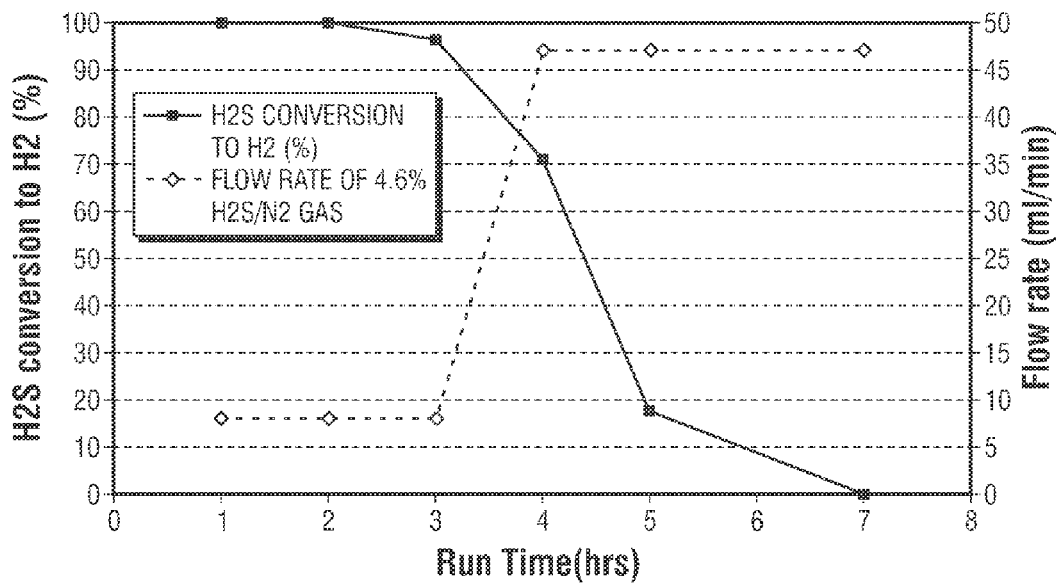
Figure 16:
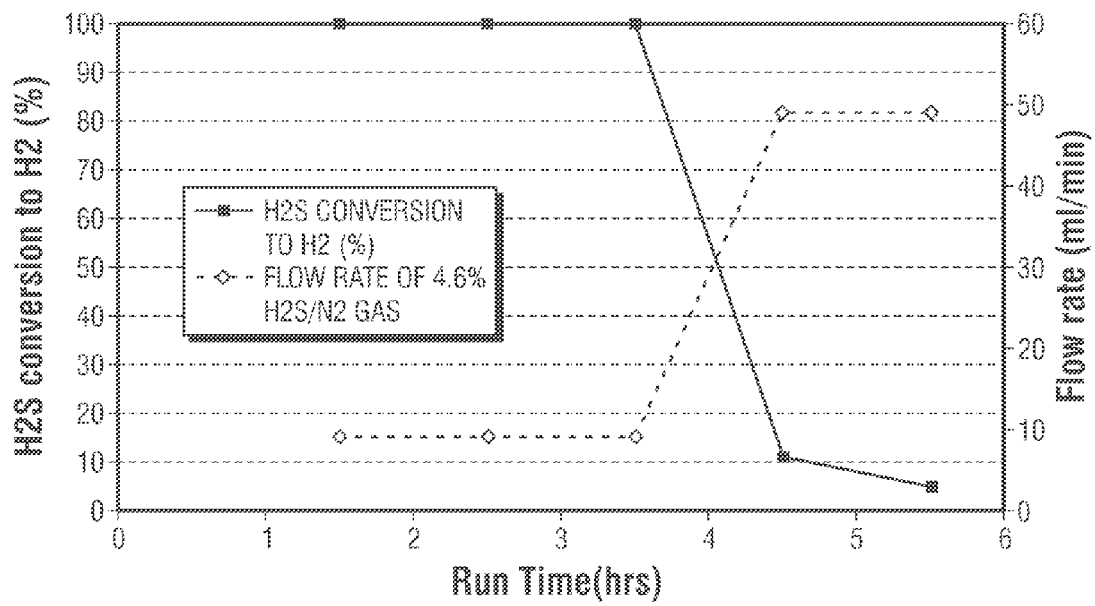
Figure 17:
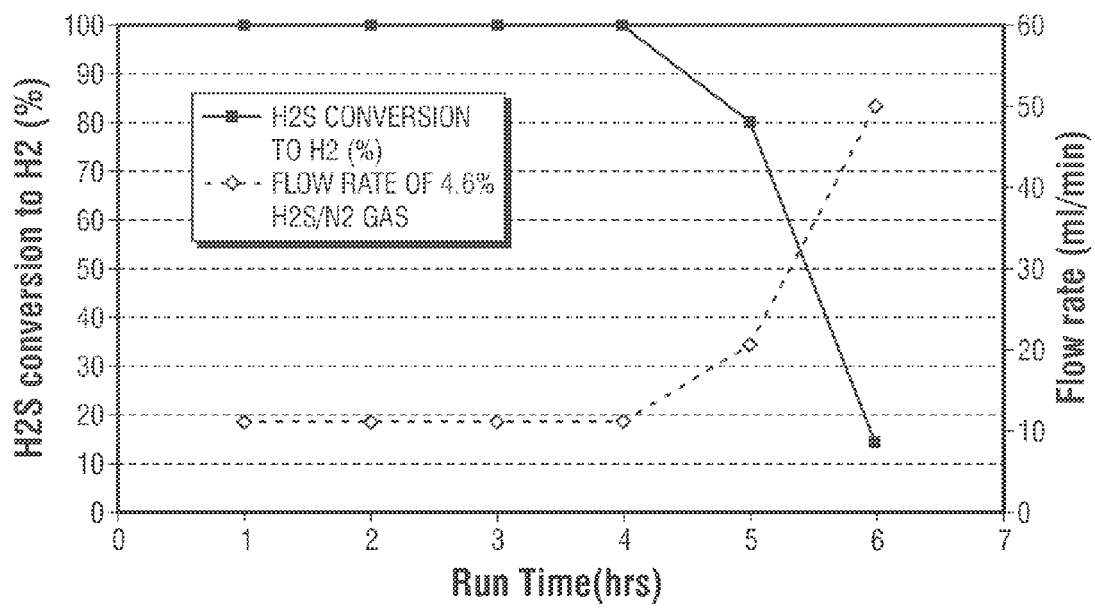

FIG. 2 is a decomposition plot for $FeS_2$.
FIG. 3 is an oxidation characteristics plot for $FeS_2$.
FIG. 4 is a decomposition plot for $NiS_2$.
FIG. 5 is an oxidation characteristics plot for $NiS_2$.
FIG. 6 is a decomposition plot for $CoS_2$.
FIG. 7 is an oxidation characteristics plot for $CoS_2$.
FIG. 8 is a decomposition plot for $CuS_2$.
FIG. 9 is an oxidation characteristics plot for $CuS_2$.
FIG. 10 is a decomposition plot for PbS.
FIG. 11 is a decomposition plot for $Sn_2S_3$.
FIG. 12 is a decomposition plot for $Na_2S_4$.
FIG. 13 is an oxidation characteristics plot for $Na_2S_4$.
FIG. 14 is a plot showing conversion of $H_2S$ to $H_2$ using $Ni_3S_2$ at 400° C.
FIG. 15 is a plot showing conversion of $H_2S$ to $H_2$ using $Ni_3S_2$ at 500° C.
FIG. 16 is a plot showing conversion of $H_2S$ to $H_2$ using FeS at 400° C.
FIG. 17 is a plot showing conversion of $H_2S$ to $H_2$ using FeS at 500° C.

As previously noted, there exists in many places around world large reservoirs of natural gas that are untapped due to extremely high concentrations of hydrogen sulfide contained in the gas. The concentration of hydrogen sulfide in some natural gas sources can even be as high as 90 volume percent or greater. But, because the volumes of the hydrocarbons from these sources can be very large, it also can be extremely desirable to be able to treat these gases in order to remove the hydrogen sulfide and to provide a marketable gas product. It is believed that one of the advantages of the inventive process is that it provides an economical way of removing hydrogen sulfide from hydrocarbon gas streams, and, in particular, the process provides for the removal of hydrogen sulfide from natural gas streams having exceptionally high concentrations of hydrogen sulfide.

Another of the advantages of the inventive process is that it can provide for the conversion of hydrogen sulfide to molecular hydrogen, elemental sulfur, and sulfur dioxide instead of as with certain other prior art processes, such as Claus units and certain other prior art processes, that convert hydrogen sulfide only to low value elemental sulfur. Molecular hydrogen typically can have a high value for use as a chemical reactant, or in refinery operations, or in other applications.

The gas streams contemplated for treatment in the inventive process can include those comprising any one or more of the hydrocarbons methane, ethane, propane, n-butane, isobutene, or one or more of the pentanes. The preferred hydrocarbons are typically those lower molecular weight hydrocarbons that are normally in the gaseous state at 0° C. (32° F.) and 100 kPa. Examples of such lower molecular weight hydrocarbons include methane, ethane, propane, n-butane, and isobutane. The invention may also process gas streams that are predominantly hydrogen sulfide and which comprise very small amounts of hydrocarbons or no amount of hydrocarbons.

The gas stream may also include at least one hydrocarbon component and be contaminated with hydrogen sulfide ($H_2S$) with the hydrogen sulfide concentration being in the range of from a very low concentration level upwardly to an extremely high concentration level of about 90 volume percent or even higher. The gas stream may be obtained from any source of hydrocarbons that contain significant concentrations of hydrogen sulfide, including, for example, refinery process streams and natural gas that is produced from underground gas reservoirs. Various sources of sour natural gas that are found around the world can contain very high concentrations of hydrogen sulfide that can be in the range of from 10 volume percent to 95 volume percent, or in the range of from 25 volume percent to 90 volume percent, or in the range of from 50 to 90 volume percent. Other sources may have hydrogen sulfide concentrations exceeding 60 volume percent or even exceeding 70 or even 80 volume percent.

The gas stream of the invention, thus, can comprise at least one hydrocarbon component that is typically a hydrocarbon selected from the group consisting of methane, ethane, propane, n-butane, isobutane, pentanes, and any combination of one or more thereof. The more typical hydrocarbon component of the gas stream is methane. The amount of hydrocarbons contained in the gas stream can be in the range of from about 5 volume percent to about 90 volume percent, and, more typically, the hydrocarbons contained in the gas stream is in the range of from 10 volume percent to 75 volume percent, and, even from 10 volume percent 50 volume percent. Certain sources of sour natural gas may have hydrocarbon concentrations upwardly to 40 volume percent or upwardly to 30 or 20 volume percent.

One of the advantages of the inventive process is that it is capable of processing lower molecular weight hydrocarbon-containing gas streams having extremely high hydrogen sulfide concentrations, and, therefore, the gas stream of the inventive process can comprise a hydrocarbon and hydrogen sulfide, wherein the hydrogen sulfide and hydrocarbons are present in the gas stream at the concentrations as earlier described. The inventive process is particularly suitable for processing sour gas streams having very high concentrations of hydrogen sulfide to yield treated gas streams having significantly reduced concentrations of hydrogen sulfide and even a sweet gas stream.

The inventive process provides for the conversion of hydrogen sulfide ($H_2S$) that is contained in hydrocarbon gas streams, or sour gas streams, to hydrogen that has a variety of uses and applications. The inventive process is particularly useful in the treatment of sour hydrocarbon gas streams that have such excessively high concentrations of $H_2S$ that conventional treatment methods may not be either technically or economically feasible in the treatment of the hydrocarbon gas streams having excessively high $H_2S$ concentrations in order to yield treated gas streams having very low $H_2S$ concentrations.

The inventive process utilizes a lower metal sulfide, represented herein as $MS_x$, which reacts with the $H_2S$ to form a higher metal sulfide, represented herein as $MS_y$, wherein y is greater than x (i.e., y>x), and molecular hydrogen, $H_2$. This sulfidation reaction is represented by the following reaction equation:

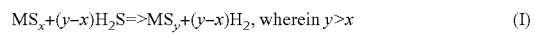
$$MS_x + (y-x)H_2S => MS_y + (y-x)H_2, \text{ wherein } y > x \quad (I)$$

In a second step of the process, the higher metal sulfide resulting from the sulfidation step undergoes a regeneration in order to convert it back into the lower valence state of the lower metal sulfide. This is done by contacting the higher metal sulfide with molecular oxygen under appropriate reaction conditions. The regeneration reactions result in converting the higher metal sulfide to the lower metal sulfide and yielding either sulfur dioxide ($SO_2$) or elemental sulfur (S), or both. The regeneration reactions are represented by the following reaction equations:

$$MS_y + (y-x)O_2 = MS_x + (y-x)SO_2 + \text{heat} \quad (II)$$

or

$$MS_y + \text{heat} = MS_x + (y-x)S \quad (III)$$

Reaction (II) is exothermic. The heat release from reaction (II) can provide heat energy to drive the decomposition of the higher metal sulfide to yield elemental sulfur as represented by reaction (III).

The metal sulfide compound of the process may be selected from any available metal sulfide compound having properties required by the process. Such required properties include the ability of the lower metal sulfide to react with hydrogen sulfide to yield molecular hydrogen and a higher metal sulfide. The higher metal sulfide should be regenerable in the since that it may be converted back to a lower form of the metal sulfide that is reusable in the conversion of hydrogen sulfide to molecular hydrogen.

Certain metallic elements found to form suitable lower metal sulfides include those selected from the group of metals consisting of iron (Fe), nickel (Ni), cobalt (Co), copper (Cu), lead (Pb), tin (Sn), and sodium (Na). Among these metals, iron and nickel are the preferred metal of the metal sulfides that are useful in the process. Examples of some of the lower forms of the metal sulfides include FeS, $Fe_7S_8$, NiS, $Ni_2S_3$, CoS, $Co_9S_8$, $Sn_3S_4$, $Na_2S$, $Na_2S_2$ and $Na_2S_3$. Both lead and tin may decompose to the metallic form which is convertible into the sulfide form. Examples of some of the higher forms of the metal sulfides that can be used in the process include $FeS_2$, $NiS_2$, $CoS_2$, $CuS_2$, PbS, $Sn_2S_3$, and $Na_2S_Z$ (wherein Z=3 or 4 or 5 or 6). The preferred metal sulfides for use in the process are the sulfides of iron or nickel.

The metal sulfide of the process may be in any form that suitably allows its use in the reactors or reaction zones of the process. For example, the metal sulfide may be in the form of small fluidizable particles comprising the metal sulfide. Also, the metal sulfide may be composited with an inert material, such as the inorganic metal oxides of alumina, silica, titania and the like, or the metal sulfide may be composited with reactive components, or the metal sulfide may be composited with both inert material and reactive components, and then shaped into formed particles that may be used in the reactors or reaction zones of the process.

In the sulfidation step of the inventive process, a gas stream comprising an exceptionally high hydrogen sulfide concentration is introduced into a sulfidation reactor wherein the gas stream is contacted with a composition that comprises a lower metal sulfide. The sulfidation reactor, typically, is a vessel which defines a sulfidation zone and provides means for containing the lower metal sulfide and for contacting the gas stream with the lower metal sulfide under suitable sulfidation reaction conditions. The sulfidation reactor may provide for and contain a fluidized bed or a fixed bed or a moving fixed bed of the lower metal sulfide reaction material of the process. The gas-solid contact is preferred to take place in a countercurrent fashion.

The sulfidation reaction conditions are any suitable conditions that promote the reaction of the lower metal sulfide and hydrogen sulfide to a higher metal sulfide and molecular hydrogen. The sulfidation reaction temperature within the sulfidation zone can be in the range of from 150° C. to 700° C. Preferably, the sulfidation reaction temperature of the sulfidation zone is in the range of from 250° C. to 550° C., and, more preferably, the sulfidation temperature is in the range of from 300° C. to 500° C. The sulfidation reaction equilibrium is not significantly dependent upon the reaction pressure, however the rate of reaction will significantly increase with increasing pressure and, thus, sulfidation reaction pressure can be in the range of from about atmospheric to about 13,840 kPa (2000 psig), and, preferably, from about 136 to 3450 kPa (5 to 500 psig).

The theoretical amount of lower metal sulfide that is contacted with the hydrogen sulfide within the sulfidation zone is the stoichiometric quantity as determined by the sulfidation reaction of reaction equation (I). However, it may be desirable, or even necessary, to contact the lower metal sulfide with an excess above the stoichiometric amount of hydrogen sulfide, or, alternatively, to contact the lower metal sulfide with less than the stoichiometric amount of hydrogen sulfide. Thus, the ratio of moles of lower metal sulfide per moles of hydrogen sulfide introduced into the sulfidation zone is generally in the range of from 0.1:1 to 10:1. Preferably, this molar ratio is in the range of from 0.25:1 to 5:1, and, more preferably, the molar ratio is in the range of from 0.5 to 3.

The contacting of the hydrogen sulfide of the gas stream with the lower metal sulfide under sulfidation reaction conditions yields molecular hydrogen and a higher metal sulfide. A treated gas stream having a reduced hydrogen sulfide concentration that is significantly less than the hydrogen sulfide concentration of the gas stream that is introduced into the sulfidation zone is withdrawn and passed from the sulfidation zone. Generally, the reduced hydrogen sulfide concentration of the treated gas stream should be less than 1 vol. % (10,000 ppmv). However, at this concentration, and even lower concentrations, of hydrogen sulfide, the treated gas stream will require an additional finishing treatment step in order to reduce the hydrogen sulfide to a concentration level to provide a sweet gas stream. The sulfidation step of the process preferably provides a treated gas stream having a reduced hydrogen sulfide concentration that is less than 0.5 vol. % (5,000 ppmv), and, more preferably, the reduced hydrogen sulfide concentration of the treated gas stream is less than 0.1 vol. % (1,000 ppmv). It is even possible, in some instances, for the sulfidation step to provide a treated gas stream having a reduced hydrogen sulfide concentration of less than 20 ppmv or even less than 10 ppmv.

The amount of hydrogen in the treated gas stream is dependent upon the amount of hydrogen sulfide contained in the gas stream that is treated and the extent of the conversion of the hydrogen sulfide to hydrogen by the sulfidation step. However, based on reaction (I), there is one mole of hydrogen that is yielded for each mole of hydrogen sulfide that is converted in the sulfidation step, and the theoretical amount of hydrogen that is contained in the treated gas stream may be easily calculated by those skilled in the art if the composition of the gas stream and the extent of the hydrogen sulfide conversion are known.

The higher metal sulfide that results from the sulfidation step of the process is then removed and passed from the sulfidation zone and introduced into a regeneration zone defined by a regenerator. It is understood that the sulfidation step may be a batch process step or a continuous process step. With a batch process step, the lower metal sulfide is reacted with hydrogen sulfide until such an amount of the lower metal sulfide is converted that the metal sulfide becomes spent, at which time, the contacting of the gas stream is stopped and the resulting metal sulfide material is removed from the sulfidation zone to be introduced into the regenerator of the process. The alternative sulfidation process step involves a continuous removal of metal sulfide that has undergone sulfidation from the sulfidation zone while simultaneously introducing regenerated lower metal sulfide into the sulfidation zone.

The regenerator defines a regeneration zone and provides means for regenerating the higher metal sulfide received from the sulfidation zone in order to convert it to the lower metal sulfide that is passed from the regeneration zone and introduced into the sulfidation zone. Molecular oxygen is introduced into the regeneration zone and is contacted with the higher metal sulfide that is received from the sulfidation zone. The contacting of the higher metal sulfide with oxygen is done under regeneration conditions that suitably provide for the conversion of the higher metal sulfide to the lower metal sulfide in accordance with either reaction (II) or reaction (III), or both reactions (II) and (III). The regeneration reaction, thus, may include yielding of either sulfur dioxide ($SO_2$) or elemental sulfur, or both $SO_2$ and S.

The contact time, as defined herein, of oxygen with the higher metal sulfide is generally in the range of from 0.1 sec. to 60 min. It is preferred for the contact time to be in the range of from 0.5 sec. to 20 min. The most practical source of oxygen for introduction into the regeneration zone and contacting with the higher metal sulfide is air, but any other suitable source of oxygen may be used as well.

The regeneration reaction conditions are any suitable conditions that promote the reaction of the higher metal sulfide and molecular oxygen to yield the lower metal sulfide and $SO_2$ or S, or both. The most practical source of oxygen for introduction into the regeneration zone is air, but any other suitable source of oxygen may be used as well. Generally, the regeneration reaction temperature is in the range of from 200° C. to 900° C. Preferably, the regeneration reaction temperature of the regeneration zone is in the range of from 350° C. to 850° C., and, more preferably, the regeneration temperature is in the range of from 400° C. to 800° C. The operating temperature of the regeneration zone may be controlled by preheating the oxygen source that is introduced into the regeneration zone. Due to reaction (II) being an exothermic reaction, a portion of the heat energy required for operating the regeneration zone may be supplied by this reaction.

The regeneration reactions are not significantly dependent upon the regeneration pressure, and, thus, the regeneration reaction pressure can be in the range of from atmospheric to 13,840 kPa (2000 psig) and, preferably, from about 136 to 3450 kPa (5 to 500 psig).

In the typical operation of the regeneration zone some ratio of reaction (II) and reaction (III) will occur resulting in a mixture of $SO_2$ and S that is yielded by the regeneration step. A regenerator gas stream is passed from the regenerator zone that typically comprises $SO_2$ or the regenerator gas stream comprises elemental sulfur, or the regenerator gas stream comprises both $SO_2$ and elemental sulfur. In a typical operation of the regeneration zone, both elemental sulfur and $SO_2$ is yielded in relative amounts such that the molar yield ratio of S to S plus $SO_2$, $S/(S+SO_2)$, is in the range of from 0.1 to 0.9. More typically, the molar yield ratio is in the range of from 0.2 to 0.85, and, most typically, the molar yield ratio is from 0.4 to 0.8. The operating conditions of the regeneration zone may be controlled so as to provide a desired molar yield ratio. Thus, the regenerator gas stream, thus, can comprise sulfur dioxide and sulfur present in such relative amounts that the ratio of sulfur to sulfur plus sulfur dioxide is in the range of from 0.1 to 0.9, more typically, from 0.2 to 0.85, and, most typically, from 0.4 to 0.8.

The resulting lower metal sulfide generated by the regeneration of the higher metal sulfide received by the regenerator from the sulfidation zone is then passed back to the sulfidation zone for reuse thereby providing for a continuous process of metal sulfide sulfidation and metal sulfide regeneration.

When the reduced concentration of hydrogen sulfide of the treated gas stream passing from the sulfidation zone is such that the treated gas stream is still not suitable for sale, then the treated gas stream is passed downstream for further processing to provide a sweet gas stream. Any suitable means or method may be used to remove hydrogen sulfide from the treated gas stream to provide a sweet gas stream having an hydrogen sulfide concentration of less than 40 ppmv, preferably less than 20 ppmv, and, more preferably, less than 10 ppmv.

A preferred method of treating the treated gas stream to remove the smaller amounts of hydrogen sulfide contained therein is to use traditional absorption scrubbing of the treated gas stream to remove hydrogen sulfide contained therein. This is done by contacting the treated gas stream with a suitable absorbent and yielding a sweet gas stream having an hydrogen sulfide concentration as referenced above. Among the absorption processes that may suitably be used to treat the treated gas stream, amine treating is preferred. Amine treating includes the use of any known amine absorbent, such as, for example, monoethanolamine (MEA), diethanolamine (DEA), methyldiethanolamine (MDEA), diisopropylamine (DIPA), and diglycolamine (DGA).

Reference is now made to the process flow schematic of FIG. 1, which includes for illustrative purposes various embodiments of the inventive metal sulfide process 10 for removing hydrogen sulfide from a gas stream and to make hydrogen and either sulfur dioxide or elemental sulfur, or both. A gas stream having an exceptionally high hydrogen sulfide concentration of greater than 25 vol. % and a normally gaseous hydrocarbon concentration in the range upwardly to 75 vol. % passes and is introduced into a sulfidation reactor 14 by way of conduit 18. Sulfidation reactor 14 is typically a vessel that defines a sulfidation reaction zone 20 which contains a lower metal sulfide. The sulfidation reaction zone 20 is operated under suitable sulfidation conditions so as to promote the reaction of hydrogen sulfide that is in the gas stream with the lower metal sulfide when contacted therewith to thereby yield molecular hydrogen and a higher metal sulfide.

A treated gas stream having a reduced hydrogen sulfide concentration of less than 10,000 ppmv and containing molecular hydrogen generated by the reaction of the lower metal sulfide with hydrogen sulfide is passed from sulfidation reaction zone 20 by way of conduit 22 to absorption unit 24. Absorption unit 24 provides for the removal of hydrogen sulfide that is contained in the treated gas stream by contacting it with a suitable absorbent fluid. A lean absorbent fluid is introduced to the absorption unit 24 through conduit 28 and a rich absorbent fluid containing hydrogen sulfide that is removed from the treated gas stream passes from the absorption unit 24 by way of conduit 30. A sweet gas stream having a significantly reduced concentration of hydrogen sulfide passes from the absorption unit 24 by way of conduit 34.

A higher metal sulfide that is yielded by the sulfidation step is removed and passes from sulfidation zone 20 by way of conduit 36 and is introduced into regenerator 40. Regenerator 40 is typically a vessel that defines a regeneration zone 42. An oxygen-containing gas passes by way of conduit 50 and is introduced into regeneration zone 42 which is operated under suitable regeneration conditions to promote the reaction of the higher metal sulfide to its corresponding lower metal sulfide and to yield either sulfur dioxide or sulfur, or both sulfur dioxide and sulfur. The regenerated lower metal sulfide is then passed from regeneration zone 42 by way of conduit 46 to be introduced into sulfidation zone 20. A regenerator gas that comprises either sulfur dioxide or sulfur, or both, passes from regeneration zone 42 by way of conduit 48.

The following examples are to illustrate various embodiments of the invention, but they are not intended to limit the invention in any way.

EXAMPLE 1

Thermogravimetric Analysis Experiments

This Example 1 describes the thermogravimetric analysis (TGA) experiments conducted with various higher metal sulfides in order to determine their regeneration characteristics whereby the lower sulfide phase is obtained through reaction of the higher metal sulfide with air (i.e., molecular oxygen) and/or an inert gas ($N_2$). These experiments helped in the determining the extent of formation of unwanted metal oxide that occurs in the regeneration of the higher metal sulfide.

The TGA experiments consisted of taking a sample of less than 20 mg of the metal sulfide and exposing it to either a nitrogen or an oxygen-containing atmosphere as the temperature was raised over time from an ambient temperature to 800° C. The temperature, temperature change and sample weight were measured during the experiment. The weight change of the sample was used to deduce the changes that took place in the sulfide phase as a function of temperature and gas environment.

In the first type of experiments, samples of the various higher metal sulfides were exposed to an atmosphere of pure nitrogen ($N_2$) while raising the exposure temperature slowly from ambient temperature to 300° C. and then from 300° C. to 800° C. This allowed the decomposition characteristics of each higher metal sulfide when exposed to an inert atmosphere, i.e., nitrogen, to be studied. After the weight of the metal sulfide had stabilized at the 800° C. temperature, the metal sulfide was then exposed to an atmosphere of an oxygen-containing gas, i.e., air, and allowed to undergo complete oxidation, which provided a weight baseline that allowed the determination of the different phases of the testing material that existed during the experiment. The results of these experiments may be depicted by what are referred to herein as decomposition plots.

The second type of experiments involved raising the temperature of the higher metal sulfide to 300° C. in an nitrogen atmosphere followed by exposing the sample to an atmosphere of an oxygen-containing gas as the temperature was raised to 800° C. This allowed for a study or observation of the oxidation characteristics of the higher metal sulfide. The results of these experiments may be depicted by what are referred to herein as oxidation characteristics plots.

EXAMPLE 2

Presentation of Results of TGA Experiments

This Example 2 presents results of the TGA experiments described in Example 1 for various metal sulfides including $FeS_2$, $NiS_2$, $CoS_2$, CuS, PbS and $Sn_2S_3$. The results presented herein demonstrate that it is possible to obtain a lower sulfide form of iron, nickel, cobalt, copper, lead or tin by reacting the respective higher sulfide form with oxygen.

$FeS_2$

The decomposition plot for $FeS_2$ is shown in FIG. 2. It is observed that at around 600° C. $FeS_2$ decomposed to $Fe_7S_8$ which was relatively stable at higher temperatures. Turning on air caused complete oxidation to $Fe_2O_3$. FIG. 3 shows the oxidation characteristics of $FeS_2$. On contacting the higher iron sulfide, $FeS_2$, with air at 300° C., there was rapid oxidation to $Fe_7S_8$. It should be noted that no oxide was observed from the weight trend at this stage. In fact, $Fe_7S_8$ was quite stable to further decomposition/oxidation as the temperature was raised. Only above 600° C. did it finally oxidize to $Fe_2O_3$.

The TGA results demonstrate that $FeS_2$ can be regenerated with air to provide a lower sulfide ($Fe_7S_8$) without the formation of oxides. The results suggest that iron oxide formation may be avoided by carefully controlling the temperature around 600° C.

$NiS_2$

FIG. 4 and FIG. 5 respectively show the decomposition and oxidation characteristics of $NiS_2$. FIG. 4 *shows* that under a $N_2$ environment, $Ni_2S_3$ decomposes to NiS in the 550-600° C. temperature window. There is further slow decomposition at higher temperatures. FIG. 5 shows that in the presence of oxygen the transition of the higher nickel sulfide to NiS took place at 400° C. No indication of oxide formation was seen at this temperature. The further raising of the temperature led to slow formation of $Ni_9S_8$ followed by slow oxidation to NiO.

$CoS_2$

FIG. 6 presents a decomposition plot for $CoS_2$. $CoS_2$ rapidly loses one sulfur atom to form CoS at temperatures above 600° C. The air oxidation results are shown in FIG. 7. There is a rapid loss of one sulfur atom at 400° C. However as soon as the desulfurization is over, potential oxidation to the sulfate form takes over. This sulfate was decomposed at temperatures exceeding 700° C. to the final oxide form.

$CuS_2$ $CuS_2$ showed similar characteristics as $CoS_2$ but at lower temperatures. FIG. 8 shows that decomposition of $CuS_2$ in an inert environment took place at about 400° C. FIG. 9 shows that during oxidation there was loss of sulfur starting at 310° C., however, possible sulfate formation took over. The exact phases could not be identified due to mismatch in the stoichiometry and experimental data. Most likely this was caused due to impurities and oxides in the $CuS_2$ sample taken.

PbS

Lead exhibits only the monosulfide form. However, the TGA decomposition data presented in FIG. 10 shows that it can be oxidized to lead metal with oxygen-containing gas with careful control of the contact time. If the contact time is exceeded, then PbO is formed. It is expected that metallic lead will react rapidly with $H_2S$ to form $H_2$.

$Sn_2S_3$

A similar behavior to Pb was shown by tin sulfide as depicted in FIG. 11, where the metallic form was obtained on decomposition at 800° C.

$Na_2S_4$

Sodium forms a number of multiple sulfides with the formula $Na_2S_x$ where x ranges from 2 to 6. It thus has the possible ability to capture large amounts of sulfur on a weight basis from hydrogen sulfide-containing streams. The results presented in FIG. 12 and FIG. 13 show that sulfides of sodium may be regenerated rapidly without forming oxides. Due to the low melting temperature of $Na_2S_4$, it would be expected to be useful in a low temperature metal sulfide process.

EXAMPLE 3

Fluid Bed Experiments

This Example 3 describes the fluid bed experiments conducted with $FeS_2$ and $NiS_2$ in which the metal sulfide is contacted with oxygen at an elevated temperature. These experiments demonstrate the regeneration characteristics of the higher metal sulfides to lower metal sulfides.

A laboratory quartz fluidized bed reactor setup was used in the experiments to study the two metal sulfides of $FeS_2$ and $NiS_2$/NiS. About 2 grams of the metal sulfide was placed inside a quartz fluidized bed reactor. The reactor was then flushed with oxygen-free nitrogen to eliminate traces of $O_2$. The reactor was then inserted into a hot sand bath to raise its temperature to 400 to 500° C. Once the desired temperature was reached, air was input into the reactor for a fixed amount of time to allow oxidation of the metal sulfide. The reactor was then flushed with $N_2$ to sweep away remaining oxygen. All the gases were passed through a cold chamber to knock out any sulfur produced. The gases were then collected in a gas bag for composition analysis by gas chromatography. The reactor was cooled and the solid products were removed and weighed.

The composition and phases of sulfides in the product solids were measured using X-ray Diffraction and Total Sulfur Analysis. For those cases in which the sulfur composition values determined by the two methods were within 20% of each other, the values were considered to be close enough for use in mass balance calculations.

The amount of elemental sulfur liberated by the metal sulfide was determined by the difference between the sulfur initially present in the solids and the sum of sulfur of the released $SO_2$ and sulfur in the product solids. Material balances were done on the metal content of the reactant and the product solids. Three values were checked: the sulfur content in the product, the sulfur liberated, and the metal mass balance. A summary of certain of the results of the experiments is presented in the following Table 1 (Results of Fluid Bed Regeneration Experiments on $FeS_2$) and Table 2 (Results of Fluid Bed Regeneration Experiments on $NiS_2$/NiS).

TABLE 1

Results of Fluid Bed Regeneration Experiments on FeS$_2$

| Run | | | | | |
|---|---|---|---|---|---|
| Catalyst Description | Iron sulfide | Iron sulfide | Iron sulfide | Iron sulfide | Iron sulfide |
| Gas to Bed | air | air | air | air | air |
| Gas Flow to Catalyst Bed (cc/min) | 1500 | 500 | 500 | 1500 | 600 |
| Minutes of Flow to Catalyst Bed | 2 | 2.5 | 7.5 | 1 | 1 |
| Total Gas Volume (cc) to Catalyst Bed | 3000 | 1250 | 3750 | 1500 | 600 |
| Rxn Temp (° C.) | 400 | 400 | 400 | 500 | 500 |
| Exotherm Temp Observed (° C.) | 438 | 405 | 401 | 516 | 505 |
| Oxygen Content of Product Solids (wt %) | 12.0 | 9.0 | 11.7 | 6.3 | 2.1 |
| Sulfur Yield in Product Gas (S/S + SO$_2$) Molar % | 80.28 | 59.60 | 30.27 | 78.46 | 53.55 |
| Moles S Lost per Moles S Initially | 1.025 | 0.670 | 0.884 | 0.852 | 0.139 |
| Sulfur Transfer Capacity: Sulfur Lost/Starting Material (wt. %) | 27.32 | 17.86 | 23.56 | 22.73 | 3.71 |

TABLE 2

Results of Fluid Bed Regeneration Experiments on NiS$_2$/NiS

| Run | | | | | | |
|---|---|---|---|---|---|---|
| Catalyst Description | NiS$_2$/NiS | NiS$_2$/NiS | NiS$_2$/NiS | NiS$_2$/NiS | NiS$_2$/NiS | NiS$_2$/NiS |
| Gas to Bed | air | air | air | air | air | none |
| Gas Flow to Catalyst Bed (cc/min) | 1500 | 1500 | 1548 | 1505 | 1500 | 0 |
| Minutes of Flow to Catalyst Bed | 5 | 10 | 4.5 | 15 | 2 | 0 |
| Total Gas Volume (cc) to Catalyst Bed | 7500 | 15000 | 6966 | 22575 | 3000 | 0 |
| Rxn Temp (° C.) | 400 | 400 | 500 | 420 | 420 | 420 |
| Exotherm Temp Observed (° C.) | 420 | 401 | 505 | 421 | 424 | 422 |
| Oxygen Content of Product Solids (wt %) | 0.9 | 0.4 | 0.9 | 1.7 | 2.5 | 3.0 |
| Sulfur Yield in Product Gas (S/S + SO$_2$) Molar % | 64.14 | 85.3 | 60.24 | 50.49 | | 98.00 |
| Moles S Lost per Moles S Initially | 0.445 | 0.445 | 0.411 | 0.528 | 0.569 | 0.151 |
| Sulfur Transfer Capacity: Sulfur Lost/Starting Material (wt. %) | 20.21 | 20.21 | 18.65 | 23.97 | 25.83 | 6.84 |

The results of these experiments show that for both FeS$_2$ and NiS$_2$ a high sulfur yield of close to 80% is viable. This high sulfur yield results in a minimization of SO$_2$ yield, which in a commercial process can result in reduced costs in the treatment of SO$_2$. A high sulfur transfer capacity of greater than 20% is achievable. This indicates that there is a selective removal of only one of the sulfur atoms from the higher metal sulfide of FeS$_2$ or NiS$_2$. The oxygen content of the product solids was kept reasonably low. It is desirable to minimize the oxygen content that is gained by the solids, since it will react with H$_2$S to form H$_2$O instead of H$_2$ leading to a loss in H$_2$ yield.

EXAMPLE 4

Packed Bed Experiments

This Example 4 describes the packed bed experiments conducted using lower sulfides of nickel and iron in order to determine the sulfur uptake characteristics of the metal sulfide and the characteristics of the metal sulfide in converting hydrogen sulfide to hydrogen at various reaction temperatures.

A number of experiments were carried out to determine the maximum H$_2$S to H$_2$ conversion when using lower sulfides of Ni and Fe at various temperatures. In these experiments a packed bed of the sulfides was created in a quartz flow reactor. The bed length was 24 inches and the sulfide was suspended over special quartz beads that can sustain high temperatures. The experiment was started with heating the bed under nitrogen to the desired reaction temperature followed by flow of a 4.63% H$_2$S/N$_2$ gas mixture. The outlet gas was collected at regular intervals in analytical bags for composition analysis using gas chromatography. The reactor was setup to permit a low gas velocity in the beginning so as to allow near thermodynamic equilibrium to be established between the reactants and products and the determination of the maximum possible conversions when starting with a gas stream containing only H$_2$S and no H$_2$.

After initial data was obtained the flow was increased in order to deviate from equilibrium considerations. Results of the testing are summarized in FIGS. 12 through 15 and Table 3. Six runs were conducted in total. Ni$_3$S$_2$ was sulfided at two different temperatures of 400 and 500° C. Similar experiments were conducted with FeS. Long duration experiments were also conducted in order to determine the maximum sulfur uptake of these materials.

As is shown by FIGS. 14 through 17 the experiments showed complete conversion of $H_2S$ to $H_2$ in the initial reaction phase. The reaction slowed down and ultimately stopped as time progressed at higher flows.

The data indicates that a very high conversion of $H_2S$ to $H_2$ is possible if proper reactants, temperatures and contacting patterns are utilized.

The data presented in Table 3 show that the sulfur content of both $Ni_3S_2$ and FeS was seen to increase upon reaction. A higher sulfur content increase is expected if porous metal sulfides were used to allow complete conversion of the metal sulfide particles.

TABLE 3

Packed bed experiment results to determine maximum conversion of $H_2S$ to $H_2$

| Purpose | Run 1 | Run 2 | Run 3 | Run 4 | Run 5 Sulfur uptake on long exposure | Run 6 |
|---|---|---|---|---|---|---|
| | Conversion of $H_2S$ to $H_2$ | | | | | |
| Temperature (° C.) | 400 | 500 | 400 | 500 | 400 | 400 |
| Gas rate (ml/hr/g starting material) | 23.53 | 24.00 | 25.73 | 20.73 | | |
| Starting Material | $Ni_3S_2$ | $Ni_3S_2$ | FeS | FeS | FeS | $Ni_3S_2$ |
| Sulfur Content (%) | 30.93 | 30.93 | 30.67 | 30.67 | 30.67 | 30.93 |
| Product | | | | | | |
| Top 25% bed Sulfur Content (%) | 37.37 | 39 | 35.93 | 34.4 | 37.23 | 37.83 |
| Bottom 75% bed Sulfur Content (%) | 35.3 | 37.5 | 32.17 | 30.07 | | |
| Maximum $H_2S$ to $H_2$ conversion observed | 100 | 100 | 100 | 100 | NA | NA |
| Moles $H_2S$ consumed v/s $H_2S$ required to make $NiS_2$ or $FeS_2$ (%) | 10.6 | 15.2 | 11.4 | 19.4 | | |

That which is claimed is:

1. A process for sweetening a sour gas stream having an exceptionally high hydrogen sulfide concentration of greater than 25 vol. % and a lower hydrocarbon concentration in the range upwardly to 75 vol. %, wherein said process comprises:
   introducing said sour gas stream into a sulfidation zone, operated under suitable sulfidation conditions and containing a lower metal sulfide, and contacting therein said gas stream with said lower metal sulfide to thereby yield molecular hydrogen and a higher metal sulfide;
   passing from said sulfidation zone a treated gas stream containing molecular hydrogen and having a reduced hydrogen sulfide concentration of less than 1 vol. % (10,000 ppmv); and
   passing from said sulfidation zone said higher metal sulfide and introducing it into a regeneration zone, operated under suitable regeneration conditions and containing molecular oxygen, and contacting therein said higher metal sulfide with said molecular oxygen to thereby yield lower metal sulfide and sulfur dioxide.

2. A process as recited in claim 1, further comprising:
   passing from said regeneration zone a regenerator gas stream containing sulfur dioxide.

3. A process as recited in claim 2, further comprising:
   passing from said regeneration zone said lower metal sulfide and introducing it into said sulfidation zone.

4. A process as recited in claim 3, further comprising:
   passing said treated gas stream to an absorption unit whereby said treated gas stream is treated to remove hydrogen sulfide therefrom and to yield a sweet gas stream.

5. A process as recited in claim 4, wherein said lower metal sulfide is a metal sulfide selected from the group consisting of FeS, $Fe_7S_8$, NiS, $Ni_2S_3$, CoS, $Co_9S_8$, $Sn_3S_4$, $Na_2S$, $Na_2S_2$, and $Na_2S_3$.

6. A process as recited in claim 5, wherein said suitable sulfidation conditions include a sulfidation reaction temperature within said sulfidation zone that is in the range of from 150° C. to 700° C., a sulfidation reaction pressure in the range of from about atmospheric to about 13,840 kPa, and a molar ratio of said lower metal sulfide to $H_2S$ within said sulfidation zone is in the range of from 0.1:1 to 10:1.

7. A process as recited in claim 6, wherein said suitable regeneration conditions include a regeneration reaction temperature within said regeneration zone that is in the range of from 200° C. to 900° C., and a regeneration reaction pressure in the range of from about atmospheric to about 13,840 kPa.

8. A process as recited in claim 7, wherein said sweet gas stream comprises less than 40 ppmv $H_2S$ and said reduced hydrogen sulfide concentration of said treated gas stream is less than 5,000 ppmv.

9. A process as recited in claim 1, wherein said lower metal sulfide is a metal sulfide selected from the group consisting of FeS, $Fe_7S_8$, NiS, $Ni_2S_3$, CoS, $Co_9S_8$, $Sn_3S_4$, $Na_2S$, $Na_2S_2$, and $Na_2S_3$.

10. A process as recited in claim 9, wherein said suitable sulfidation conditions include a sulfidation reaction temperature within said sulfidation zone that is in the range of from 150° C. to 700° C., a sulfidation reaction pressure in the range of from about atmospheric to about 13,840 kPa, and a molar ratio of said lower metal sulfide to $H_2S$ within said sulfidation zone is in the range of from 0.1:1 to 10:1.

11. A process as recited in claim 10, wherein said suitable regeneration conditions include a regeneration reaction temperature within said regeneration zone that is in the range of from 200° C. to 900° C., and a regeneration reaction pressure in the range of from about atmospheric to about 13,840 kPa.

12. A process as recited in claim 11, wherein said lower metal sulfide is selected from the group consisting of FeS, $Fe_7S_8$, NiS, and $Ni_2S_3$.

13. A process as recited in claim 2, wherein said lower metal sulfide is a metal sulfide selected from the group consisting of FeS, $Fe_7S_8$, NiS, $Ni_2S_3$, CoS, $Co_9S_8$, $Sn_3S_4$, $Na_2S$, $Na_2S_2$, and $Na_2S_3$.

14. A process as recited in claim 13, wherein said suitable sulfidation conditions include a sulfidation reaction temperature within said sulfidation zone that is in the range of from 150° C. to 700° C., a sulfidation reaction pressure in the range of from about atmospheric to about 13,840 kPa, and a molar ratio of said lower metal sulfide to $H_2S$ within said sulfidation zone is in the range of from 0.1:1 to 10:1.

16. A process as recited in claim 14, wherein said suitable regeneration conditions include a regeneration reaction temperature within said regeneration zone that is in the range of from 200° C. to 900° C., and a regeneration reaction pressure in the range of from about atmospheric to about 13,840 kPa.

16. A process as recited in claim 15, wherein said lower metal sulfide is selected from the group consisting of FeS, $Fe_7S_8$, NiS, and $Ni_2S_3$.

* * * * *